(12) United States Patent
Mannava et al.

(10) Patent No.: US 7,937,505 B2
(45) Date of Patent: May 3, 2011

(54) METHOD AND SYSTEM FOR FLEXIBLE AND NEGOTIABLE EXCHANGE OF LINK LAYER FUNCTIONAL PARAMETERS

(75) Inventors: Phanindra K. Mannava, Folsom, CA (US); Victor W. Lee, San Jose, CA (US); Aaron T. Spink, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 12/242,271

(22) Filed: Sep. 30, 2008

(65) Prior Publication Data

US 2009/0063813 A1 Mar. 5, 2009

Related U.S. Application Data

(63) Continuation of application No. 11/238,491, filed on Sep. 28, 2005, now Pat. No. 7,484,014.

(51) Int. Cl.
*G06F 3/00* (2006.01)
(52) U.S. Cl. ............................................ 710/10; 710/15
(58) Field of Classification Search .................. 710/1, 8, 710/10, 11, 36
See application file for complete search history.

(56) References Cited

U.S. PATENT DOCUMENTS

| 7,738,484 | B2 * | 6/2010 | Ayyar et al. ............. 370/453 |
| 2005/0262284 | A1 | 11/2005 | Cherukuri et al. |
| 2005/0262368 | A1 | 11/2005 | Cherukuri et al. |
| 2006/0034295 | A1 | 2/2006 | Cherukuri et al. |
| 2009/0265472 | A1 | 10/2009 | Ayyar et al. |

OTHER PUBLICATIONS

Office Action for U.S. Appl. No. 11/238,491 mailed Mar. 18, 2008, 10 pgs.
Notice of Allowance for U.S. Appl. No. 11/238,491 mailed Sep. 22, 2008, 8 pgs.
Anderson, Don et al., "HyperTransport System Architecture", 2003, MindShare, Inc., pp. 1-53.
Office Action for U.S. Appl. No. 12/242,283 mailed Jun. 11, 2010, 7 pgs.
Final Office Action for U.S. Appl. No. 12/242,283 mailed Sep. 21, 2010, 10 pgs.

* cited by examiner

*Primary Examiner* — Alford W Kindred
*Assistant Examiner* — Richard B Franklin
(74) *Attorney, Agent, or Firm* — Blakely, Sokoloff, Taylor & Zafman LLP

(57) ABSTRACT

A proposal is discussed that facilitates exchanging parameters for a link layer that allows a variable number of parameters without changing a communication protocol. Likewise, the proposal allows for both components connected via the link to negotiate values for the parameters that are exchanged without a need for external agent intervention or redundancy.

12 Claims, 7 Drawing Sheets

| L17 | L16 | L15 | L14 | L13 | L12 | L11 | L10 | L9 | L8 | L7 | L6 | L5 | L4 | L3 | L2 | L1 | L0 | C1 | C0 |
|---|---|---|---|---|---|---|---|---|---|---|---|---|---|---|---|---|---|---|---|
| Type (4:0) | | | | | | | | | | | | | | | RSVD | | | CRC | |
| 1 | 1 | | | | 1 | 1 | 1 | 0 | 0 | 1 | 0 | 0 | 1 | x | | | | | |
| 1 | 1 | | | | | | | Data Field (15:0) | | | | | | | | | | | |
| 1 | 1 | | | | | | | Data Field (31:0) | | | | | | | | | | | |

Type Encodings

| Type Enc | Message | Meaning |
|---|---|---|
| 0b000000 | Ready_For_Init | Interlock Message 1 |
| 0b01000 | Param.0 | Parameter Set 0 |
| 0b01001 | Param.1 | Parameter Set 1 |
| 0b01010 | Param.2 | Parameter Set 2 |
| 0b01011 | Param.3 | Parameter Set 3 |
| 0b10000 | Param.4 | Parameter Set 4 |
| 0b10001 | Param.5 | Parameter Set 5 |
| 0b10010 | Param.6 | Parameter Set 6 |
| 0b10011 | Param.7 | Parameter Set 7 |
| 0b11110 | Ready For Normal Op | Interlock Message 2 |
| 0b11111 | Begin Normal Op | Marker for beginning of normal operation |

Link Layer initialization control messages

FIG. 2

METHOD AND SYSTEM FOR FLEXIBLE AND NEGOTIABLE EXCHANGE OF LINK LAYER FUNCTIONAL PARAMETERS

RELATED APPLICATIONS

This application is a continuation of U.S. patent application Ser. No. 11/238,491 filed Sep. 28, 2005 now U.S. Pat. No. 7,484,014.

BACKGROUND OF THE INVENTION

1. Field of the Invention

The present invention relates to I/O bus technology, specifically, parameter exchange for a link layer.

2. Description of the Related Art

As is well known, input/output (I/O) buses connect different components together in a computer system. One example of an I/O bus is a link, which is a point-to-point interconnect connecting two components (these components can be on the same circuit board or across two different boards). A link could be bi-directional and consists of an out-going direction and an in-coming direction. Likewise, the width of the link is scalable from one bit (a.k.a. serial) to multiple bits in parallel. A single bit is transferred from the source component via a transmitter and received at the destination via a receiver. In the multi-bit parallel links, multiple bits are transferred simultaneously in parallel through multiple transmitter and receiver pairs. The signaling technology can be single-ended or differential. One example of a link is depicted in FIG. 1.

PCI-express and SCID links exchange physical layer operation parameters by embedding the component value in the special training sequences. For reference, PCI-express is discussed in "PCI-express Base Specification Rev 1.0, Jul. 22, 2002". Each component then examines the incoming value and compares with its outgoing value. Based on a predetermined schedule, the two components would arrive at a final agreed value. For example, the PCI-Express links exchange its data rate, the number of training sequences required, link polarity and the reset condition in its initialization phase. However, a change in the protocol is required in order to support parameter negotiation in the PCI-express or the SCiD physical layer method. Furthermore, both methods only permit exchange of fixed number of parameters with no ability to expand.

Typically, external agents are involved for reading capabilities of different link interfaces and setting link operation registers.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Table 1 is a list of parameters as utilized by one embodiment of the claimed subject matter.

FIG. 2 is an example of messages as utilized by one embodiment of the claimed subject matter.

Figure 1:
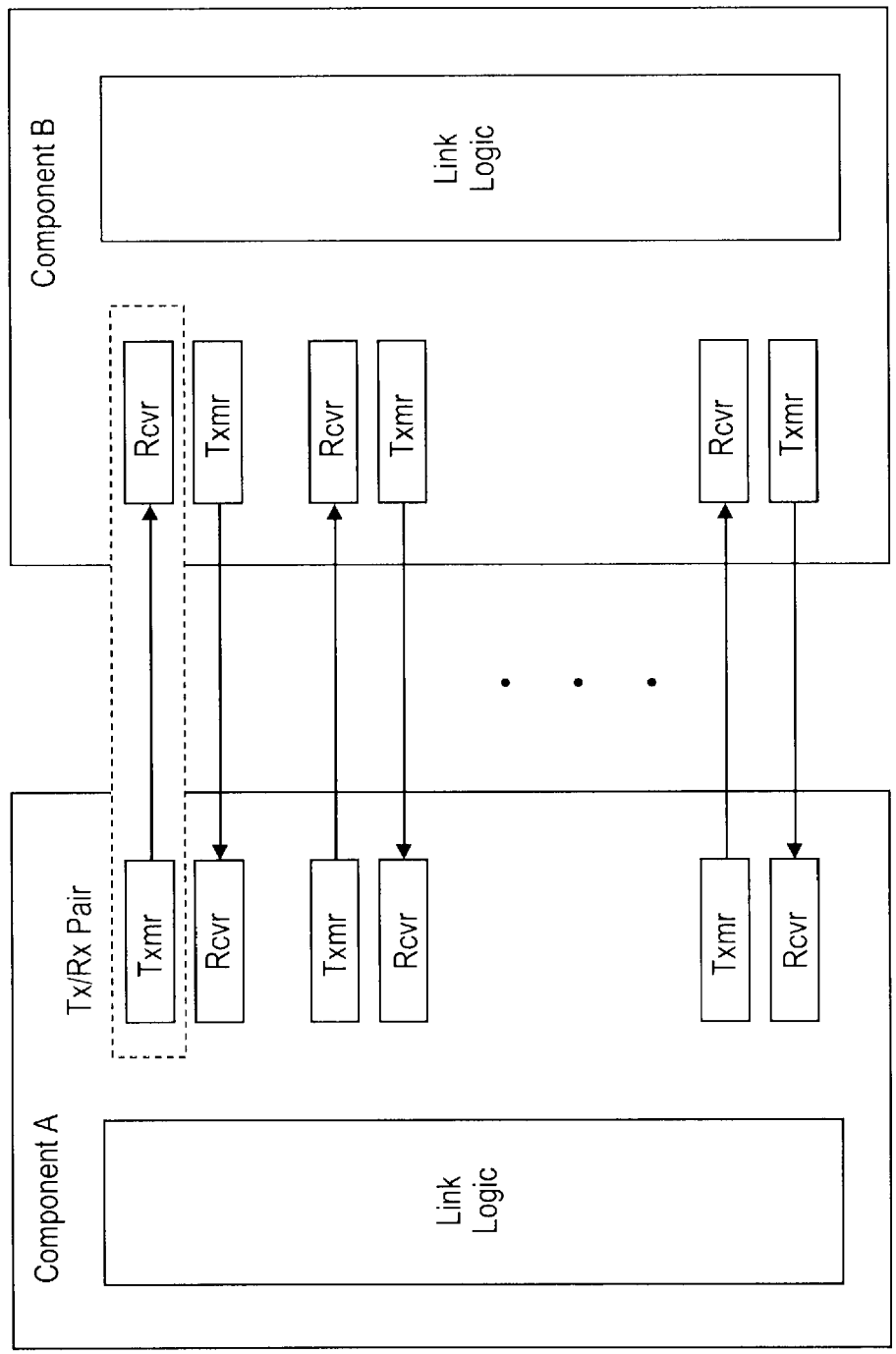
FIG. 1 is a prior art link.
Figure 3:
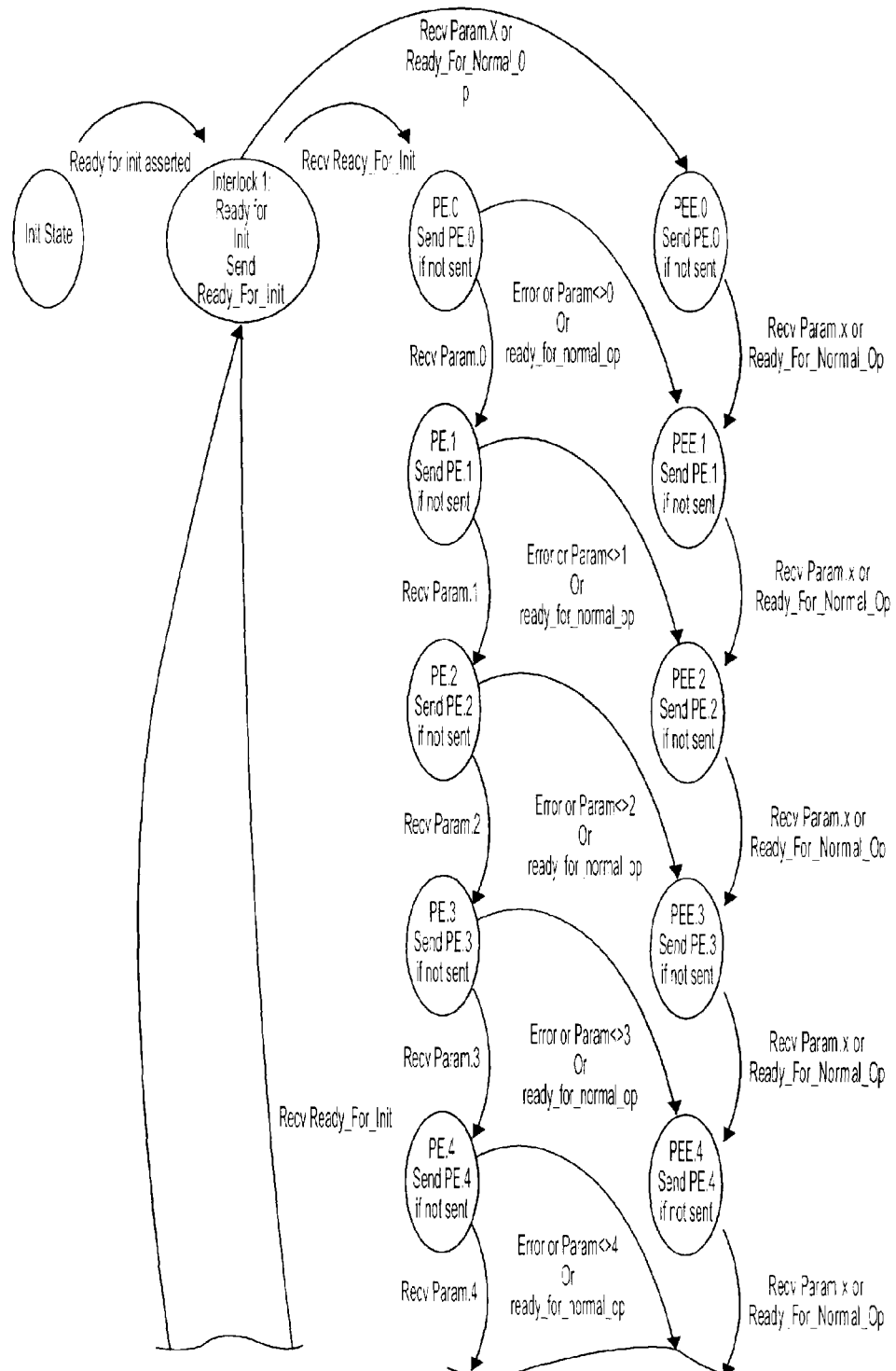
Figure 3:
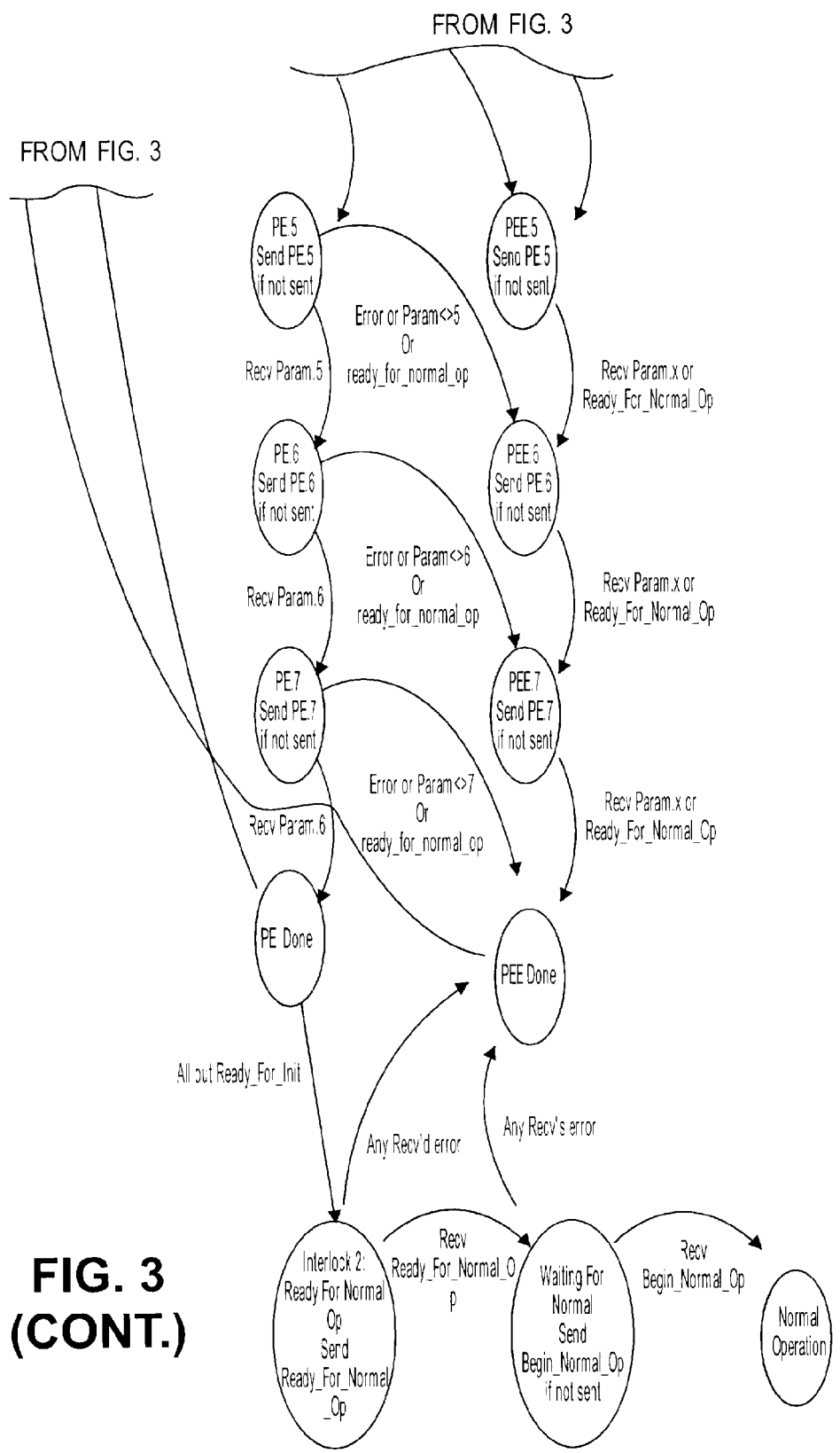

FIG. 3 is a method of a flowchart for link layer algorithm as utilized by one embodiment of the claimed subject matter.

Figure 4:
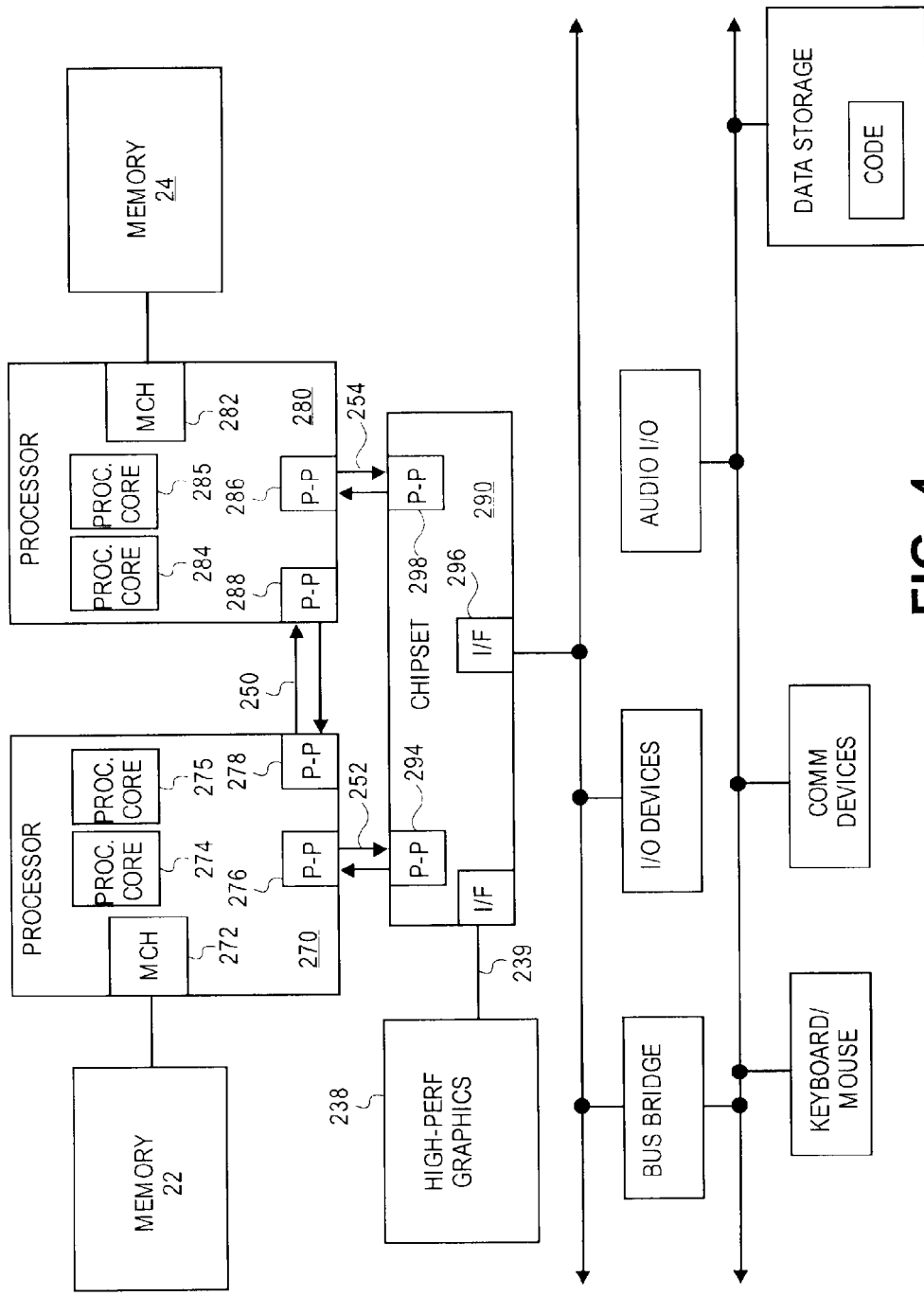

FIG. 4 is a system as utilized by one embodiment of the claimed subject matter.

Figure 5:
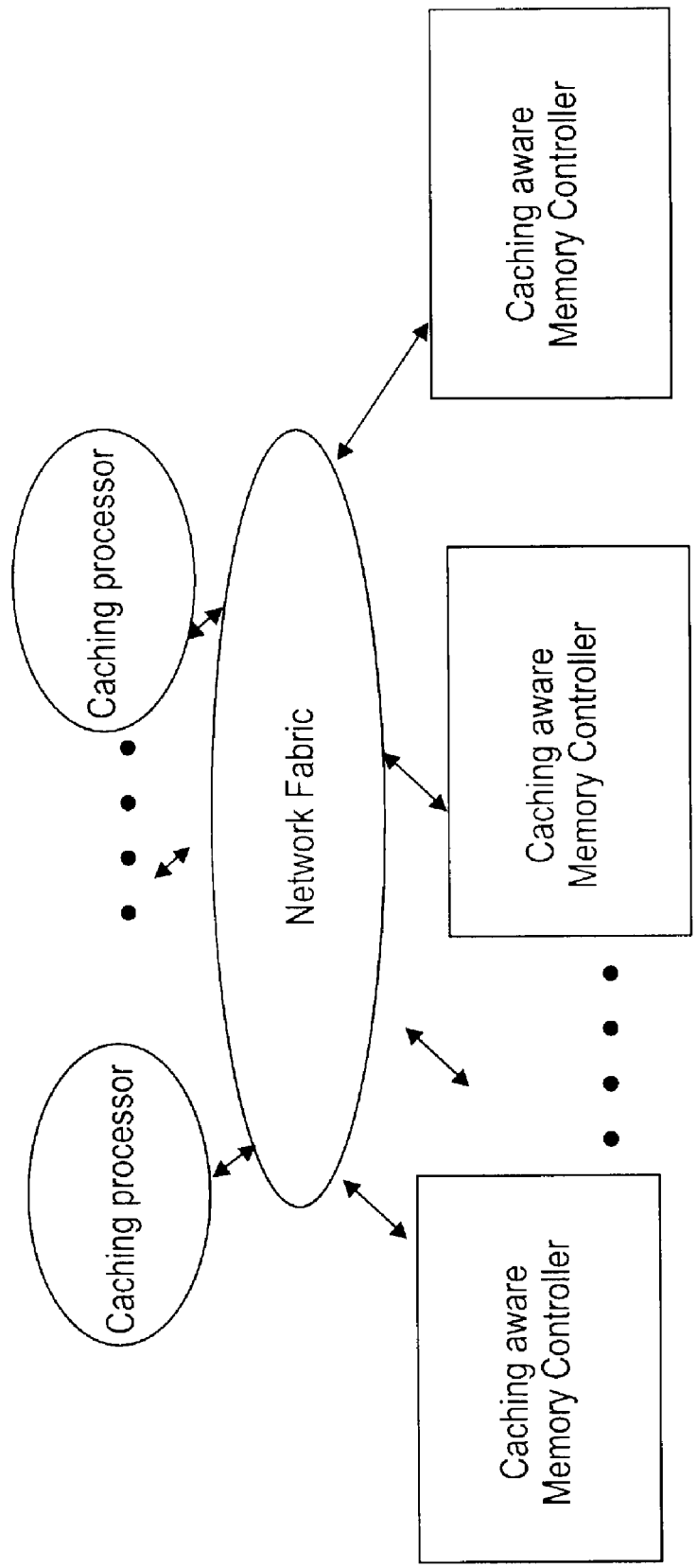

FIG. 5 is a protocol architecture as utilized by one embodiment.

Figure 6:
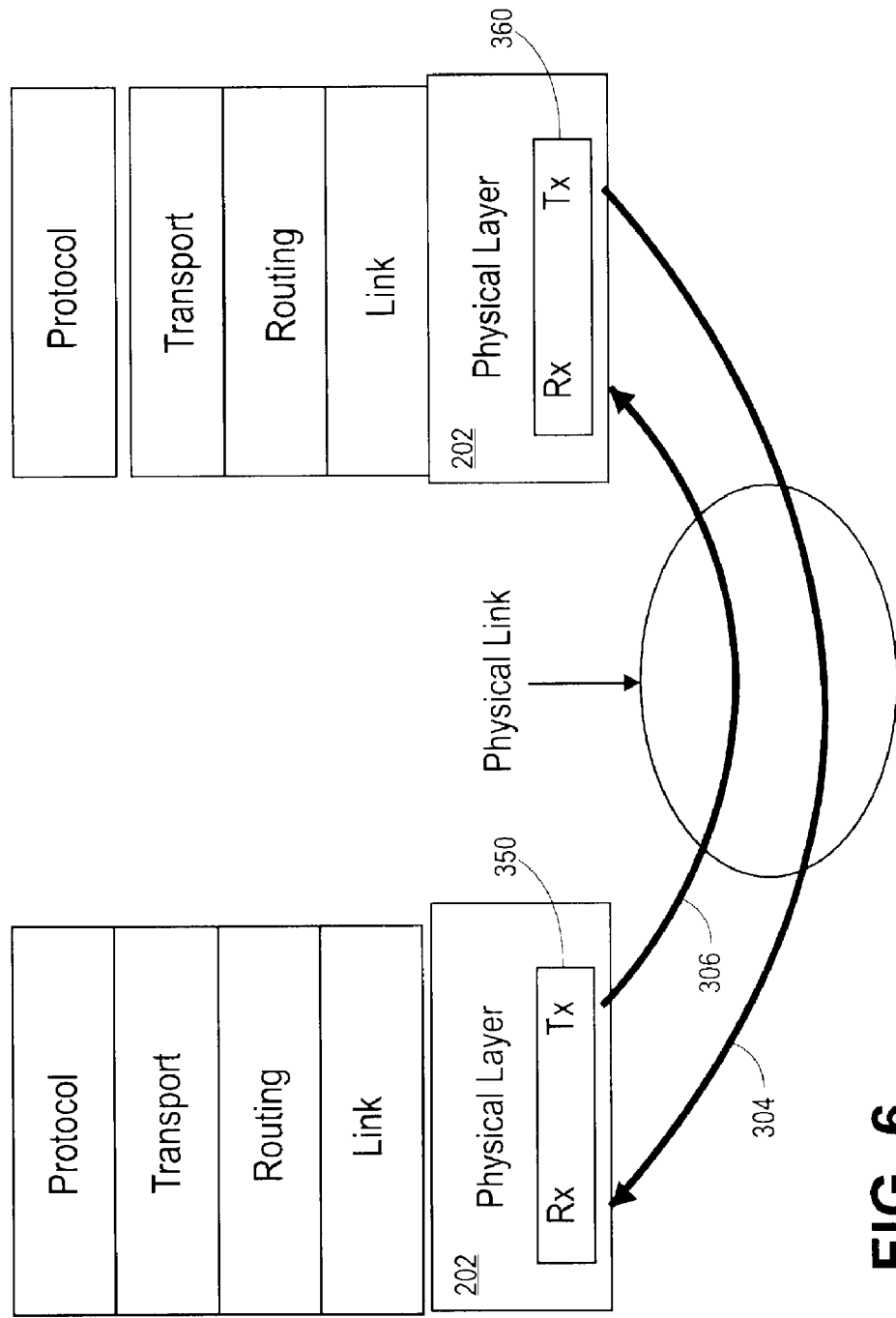

FIG. 6 is a block diagram of an apparatus for a physical interconnect utilized in accordance with the claimed subject matter.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

An area of current technological development relates to I/O buses. As previously described, the existing solutions either require external agent intervention, require protocol changes, or fixed number of exchanged parameters.

In contrast, a method and a system are proposed that facilitates exchanging parameters for a link layer that allows a variable number of parameters without changing a communication protocol. Likewise, the method and system allow for both components connected via the link to negotiate values for the parameters that are exchanged without a need for external agent intervention or redundancy. As previously discussed, a need exists for exchanging and negotiating parameters since each agent may have a different capability for the respective link interface, in terms of reliability support (RAS), link width, flow control, etc.

In one embodiment, a network fabric is used to communicate among the different components on the link. This network fabric allows for a layered protocol and may comprise either or all of: a link layer, a protocol layer, a routing layer, a transport layer, and a physical layer. The fabric facilitates transporting messages from one protocol (home or caching agent) to another protocol for a point to point network. In one embodiment, the point to point network is depicted in connection with FIGS. 5 and 6.

Table 1 is a list of parameters as utilized by one embodiment of the claimed subject matter. This table illustrates a default operational state for a link. For example, a link is initialized by powering up physical and link layers of the components on the two ends of the link. In this embodiment, the physical layer initialization results in a default operational state for the link. To be able to bring a link up in default operational state, all components at a minimum must implement one set of values for the parameters.

The Table 1 has four columns, (reading from left to right): Parameter, Values, Default Value for the Parameter, and Negotiable Status. The "Values" column lists acceptable values for the listed parameter. The "Negotiable" column indicates if a parameter value is negotiated between the two ends. Parameters such as number of credits and retry buffer depth and agent types are informational parameters. Therefore, they are not negotiable. However, they do not have to have the same values at the two ends of the link. In one embodiment, the following is a list and definition of some of the parameters exchanged with the proposed method and system. However, the claimed subject matter is not limited to this list. One skilled in the art appreciates utilizing different parameters and could be implementation specific.

1. Interleave: The process of preempting sending of messages from a different virtual channel before the current message is completely sent over the link.
2. Virtual channel: It is a logical link between the two link layers, used to prioritize different classes of traffic and to avoid network deadlocks. Multiple virtual channels are mapped to a single physical channel.

3. Flow Control: Flow control at the link layer is done using credits for each individual virtual channel.
4. Cyclic Redundancy Check (CRC): A polynomial based error detection scheme, e.g. 8 bit CRC involves an $8^{th}$ order generator polynomial.
5. Link Level Retry: When a link layer receives a message in error, it 'informs' the sender to retransmit that message and in the case of 'go back n'[1] type protocols retransmits all subsequent messages. For this reason the sender keeps the messages that are sent in an 'retry buffer' till an acknowledgement is received.
   [1] Tanenbaum, Computer Networks, Second edition Prentice Hall, Englewood Cliffs, N.J. 1989
6. Profile: The system parameters are grouped into different configurations based on their values. e.g. A desktop profile, a server profile etc.
7. Agent type: This identifies the type of agent that is connected to the link. Examples of agent types are Memory agent, caching agent, IO agent etc. CSI spec includes a long list of agent types.

FIG. 2 is an example of messages as utilized by one embodiment of the claimed subject matter. In this embodiment, the three depicted messages are used to transfer parameter values and to handshake during acknowledgement. The messages and their use will be discussed in further detail in connection with FIG. 3.

FIG. 3 is a method of a flowchart for link layer algorithm as utilized by one embodiment of the claimed subject matter. Prior to the depicted flowchart, a link between two components is in a default operational state after completion of a physical layer initialization. Likewise, the link layers of the two components have synchronized and have turned on link layer error detection. Hence, this method for a flowchart is performed after the link has been synchronized and link layer error detection is enabled. In this embodiment, the flowchart may be repeated as necessary.

In one embodiment, a control message is used to transfer parameter values and to handshake during acknowledgement. In this embodiment, three types of special control messages are used, such as, but not limited to: 'Null.Nop', 'Parameter Exchange' (PE), and interlock messages.

Then each link layer repeats the following
   i) The link layer sends a first type of control message, Null.Nop until any product specific reset sequences that are needed before link layer initialization are complete. For example, waiting for a service processor to set the local node ids.
   ii) The link layers exchange a second type of control message, an interlock signal, which is 'ready to init parameter exchange'. This interlock is completed only after a link layer agent receives as well sends 'ready to init parameter exchange' message.
   iii) Once the interlock is complete, the link layer will begin sending a third type of control message, parameter exchange {PE} messages. During the parameter exchange, if the link layer is not sending a parameter exchange message, it sends the first type of control message, Null.Nop.
   iv) If an error occurs during the parameter exchange, the link layer agent detecting the error reverts to sending the second type of control message for an interlock 'ready_for_init parameter exchange messages', which will cause both agents to re-sync at the first interlock and retry the parameter exchange operation.
   v) Once a link layer agent completes sending all the third type of control message, 'PE' messages and has not detected any errors on the received 'PE' messages, it starts sending the second type of control message, an interlock message, which is a 'Begin normal operation' message. This provides the second interlock between the two link layer agents. The link layer comes out of the second interlock only after it both sends and receives the 'Begin normal operation' messages.
   vi) When an agent receives the second type of control message, an interlock message, the 'Begin_normal_operation' message it will commit the parameters that were exchanged to the active state. For example, if both agents choose to enable 16 bit CRC instead of 8 bit then the link layer will activate the 16 bit CRC on the sender immediately after the 'Begin_normal_operation' message.

In one embodiment, the negotiation algorithm is as follows. The link layer is brought up after the physical layer. As the link layer is brought up, the default parameter states are assumed. During the link layer parameter exchange phase, each link layer parameter are exchanged and negotiated. For example, Parameter A has a default value of 0. Then, when the link layer is brought up initially, both ends of the link will have the same value (0) for parameter A. During the parameter exchange phase, one end of the link (for ease of explanation, it is referred to as the north-end) would want the parameter to go to 1 and the other end (for ease of explanation, it is referred to as the south-end) of the link would want the value to go to 2. When each end receives the PE message indicating a different value than what it wants (for example, north-end receive 2 and it wants 1), the link layer logic will use a pre-determined table to select the final parameter. (In this example, suppose parameter A would prefer 1 over 2). Then, the north-end will keep its value and the south end would change its value to it. However, both ends continue to operate assuming Parameter A=0 until both ends see the "Begin_Normal_Op message". At that moment, both ends switch Parameter A to 1.

In one embodiment, the error handling algorithm is as follows: If during parameter exchange, either side of the link detected a transmission error or negotiation error (for example, if a link agent receive a parameter value that's out of range), the agent will send "Ready_For_Init" to reset the process. The whole exchange phase will start over again.

FIG. 4 is a system as utilized by one embodiment of the claimed subject matter. In particular, FIG. 4 shows a system where processors, memory, and input/output devices are interconnected by a number of point-to-point interfaces.

The system of FIG. 4 may also include several processors, of which only two, processors 270, 280 are shown for clarity. Processors 270, 280 may each include a memory controller or a local memory controller hub (MCH) 272, 282 to connect with memory 22, 24. The memory could be a cache memory, SRAM, and/or DRAM. In one embodiment, processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. In one embodiment, the processors 270 and 280 would have multiple processor cores. Chipset 290 may also exchange data with a high-performance graphics circuit 238 via a high-performance graphics interface 239.

FIG. 5 is a high level, simplified abstraction of a protocol architecture as utilized by one embodiment. The fabric facilitates transporting messages from one protocol (caching processor or caching aware memory controller) to another protocol for a point to point network. In one aspect, the figure depicts a cache coherence protocol's abstract view of the underlying network.

FIG. 6 is a block diagram of an apparatus for a physical interconnect utilized in accordance with the claimed subject matter. In one aspect, the apparatus depicts a layered protocol and may comprise either or all of: a link layer, a protocol layer, a routing layer, a transport layer, and a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

Also, the claimed subject matter depicted in the previous Figures and Tables may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A system for exchanging parameters between a first agent and a second agent comprising:
a dynamic random access memory coupled to at least the first agent or the second agent;
the first agent and the second agent coupled via a link interconnect that supports a layered protocol with at least a physical layer and a link layer;
the first agent and the second agent with different interface capabilities;
the physical layer for the link interconnect to be initialized and error detection for the link layer is enabled;
the first agent and second agent to correspond via a plurality of control messages until a negotiation is completed to allow the first agent and the second agent to resolve the difference in interface capabilities without a need for intervention from an another agent, wherein a first type of control message is utilized until reset sequences that are performed before link layer initialization is complete, a second type of control message is utilized after either the first agent or the second agent receives a message indicating readiness to perform parameter exchange, and a third type of control message is used to exchange link layer parameters.

2. The system of claim 1 wherein the plurality of control messages is a No operation message, a Parameter exchange message (PE), and two types of interlock messages.

3. The system of claim 2 wherein the first type of interlock message is a ready to init parameter exchange message that is completed after the link layer of both the first and the second agent receives as well as sends the ready to init parameter exchange message.

4. The system of claim 2 wherein the No operation message is constantly sent until any specific reset sequences for the system are needed before the completion of the link layer initialization.

5. The system of claim 2 wherein an event of an error during the parameter exchange is detected, the link layer of the first agent or second agent that detects the error results in reverting to sending the first type of interlock message, the ready to init parameter exchange message, that results in both agents to re-synchronize at a first interlock and retry the parameter exchange operation, otherwise, once a link layer completes sending all the PE messages without detecting any errors, it starts sending the second type of interlock message, a Begin normal operation message, that provides the second interlock after the link layer of the first agent and second agent both send and receive this message.

6. The system of claim 1 wherein the first and second agent is an I/O component, a processor, or a memory.

7. A system for exchanging parameters between a first agent and a second agent comprising:
a dynamic random access memory coupled to at least the first agent or the second agent;
the first agent and the second agent coupled via a link interconnect that supports a layered protocol with at least a physical layer and a link layer;
the first agent and the second agent with different interface capabilities;
the physical layer for the link interconnect to be initialized and error detection for the link layer is enabled;
the first agent and second agent to correspond via a plurality of control messages until a negotiation is completed to allow the first agent and the second agent to exchange a variable number of parameters without a need for intervention from an another agent, wherein a first type of control message is utilized until reset sequences that are performed before link layer initialization is complete, a second type of control message is utilized after either the first agent or the second agent receives a message indicating readiness to perform parameter exchange, and a third type of control message is used to exchange link layer parameters.

8. The system of claim 7 wherein the plurality of control messages is a No operation message, a Parameter exchange message (PE), and two types of interlock messages.

9. The system of claim 8 wherein the first type of interlock message is a ready to init parameter exchange message that is completed after the link layer of both the first and the second agent receives as well as sends the ready to init parameter exchange message.

10. The system of claim 8 wherein the No operation message is constantly sent until any specific reset sequences for the system are needed before the completion of the link layer initialization.

11. The system of claim 8 wherein an event of an error during the parameter exchange is detected, the link layer of the first agent or second agent that detects the error results in reverting to sending the first type of interlock message, the ready to init parameter exchange message, that results in both agents to re-synchronize at a first interlock and retry the parameter exchange operation, otherwise, once a link layer completes sending all the PE messages without detecting any errors, it starts sending the second type of interlock message, a Begin normal operation message, that provides the second interlock after the link layer of the first agent and second agent both send and receive this message.

12. The system of claim 7 wherein the first and second agent is an I/O component, a processor, or a memory.

* * * * *